United States Patent
Butler et al.

(10) Patent No.: US 7,538,872 B1
(45) Date of Patent: May 26, 2009

(54) DIAGNOSTIC METHODS AND APPARATUS FOR DIRECTED ENERGY APPLICATIONS

(76) Inventors: Eugene W. Butler, 1182 W. Ella, Corrales, NM (US) 87048; L. John Otten, III, 53 La Puerta Trail, Placitas, NM (US) 87403; Gavin R. G. Erry, 6350 Eubank NE., Apt. 722, Albuquerque, NM (US) 87111

( * ) Notice: Subject to any disclaimer, the term of this patent is extended or adjusted under 35 U.S.C. 154(b) by 220 days.

(21) Appl. No.: 11/498,397

(22) Filed: Aug. 2, 2006

(51) Int. Cl.
*G01J 1/00* (2006.01)
*G01J 3/28* (2006.01)
*G01J 3/45* (2006.01)
*G01N 21/00* (2006.01)
*G01B 9/02* (2006.01)

(52) U.S. Cl. .................. 356/326; 356/121; 356/456
(58) Field of Classification Search ......... 356/451, 356/456, 121, 300, 301, 303, 305, 326, 328
See application file for complete search history.

(56) References Cited

U.S. PATENT DOCUMENTS

| | | | | |
|---|---|---|---|---|
| 3,664,741 A * | 5/1972 | Bonnet et al. | ................. | 356/300 |
| 4,712,913 A * | 12/1987 | Bareket | ..................... | 356/121 |
| 4,830,512 A * | 5/1989 | Grego | ..................... | 374/54 |
| 5,017,004 A * | 5/1991 | Cross et al. | ................. | 356/121 |
| 5,539,517 A * | 7/1996 | Cabib et al. | ................. | 356/456 |
| 5,784,162 A * | 7/1998 | Cabib et al. | ................. | 356/456 |
| 5,914,779 A * | 6/1999 | Kalshoven | ................. | 356/317 |
| 6,040,566 A * | 3/2000 | Rioland et al. | ........... | 250/201.9 |
| 6,052,187 A * | 4/2000 | Krishnan et al. | ............. | 356/364 |
| 6,060,685 A * | 5/2000 | Chou et al. | ............. | 219/121.83 |
| 6,115,123 A * | 9/2000 | Stappaerts et al. | .......... | 356/457 |
| 6,175,750 B1 * | 1/2001 | Cook et al. | ................. | 600/310 |
| 6,556,853 B1 * | 4/2003 | Cabib et al. | ................. | 600/407 |
| 6,717,668 B2 * | 4/2004 | Treado et al. | ............... | 356/327 |
| 6,736,507 B2 * | 5/2004 | Kudryashov et al. | ........ | 351/206 |
| 6,992,775 B2 * | 1/2006 | Soliz et al. | .................. | 356/456 |
| 7,286,222 B2 * | 10/2007 | Gardner, Jr. | ................. | 356/301 |
| 7,342,658 B2 * | 3/2008 | Kowarz et al. | ................. | 356/328 |
| 7,420,664 B2 * | 9/2008 | Treado et al. | ................. | 356/72 |
| 7,471,389 B2 * | 12/2008 | Tuschel et al. | ............... | 356/301 |

* cited by examiner

*Primary Examiner*—Patrick J Connolly
*Assistant Examiner*—Scott M Richey (57) ABSTRACT

Determining relationships between one laser beam and an object onto which such beam is directed including: directing such beam onto the object; collecting radiation from the beam that is reflected back; spectrally discriminating the collected, reflected radiation from other collected radiation; generating an image of the collected beam radiation; and analyzing this image to determine the value of at least one parameter selected from: the diameter of the beam on the object; the position of the beam on the object; and beam quality on the object. The determined value(s) may be used to adjust parameter(s) of the beam. Additional steps include directing a second beam onto the object and collecting, spectrally discriminating, generating an image and analyzing it to determine the value of at least one parameter related to the second beam. The forgoing may also include utilizing the determined second value to adjust parameter(s) of the second beam.

13 Claims, 9 Drawing Sheets

(Prior Art)

Figure 3

(Prior Art)

DIAGNOSTIC METHODS AND APPARATUS FOR DIRECTED ENERGY APPLICATIONS

GOVERNMENTAL RIGHTS CLAUSE

This invention is made with U.S. Government support under contract: FA 9451-04-C-0039. The U.S. government has certain rights in the invention.

FIELD OF THE INVENTION

This invention relates to diagnostic methods and apparatus for directed energy applications. More particularly, this invention relates to methods and apparatus for determining one or more relationships between one or more laser beams and an object onto which such beam(s) is (are) directed. The relationships include determining, for each laser, the size of the beam on the object (i.e., the spot size), its position on the object, and the interaction, if any, between laser and the object. Beam quality (e.g., wavelength and, to the extent the beam spot can be resolved, the energy distribution of the beam across the spot) can also be determined.

BACKGROUND OF THE INVENTION

Spectrometers are, broadly speaking, optical instruments which collect electromagnetic radiation from a source and resolve it into its fundamental spatial, spectral and power (or energy) components. Broadly speaking, there are two classes of spectrometers: interferometric designs; and dispersive designs. Again, broadly speaking, interferometric designs split incoming radiation into two beams and then recombine them with a distance shift across the wave front to form interference fringes. The interference patterns can be captured on film or by, for instance, a semi-conductor array detector (e.g., a charged coupled device (CCD)). The spectra of the incoming radiation is then inferred from such interference fringes via an algorithm. Sometimes an interferometer is referred to as a Fourier Transform interferometer because it is necessary to perform a Fourier Transform on the interferogram (which is the output of the instrument) in order to produce the spectra of the imaged light. Dispersive spectrometers include an optical element that has some property that varies with wavelength. The most common examples are gratings and prisms. In such spectrometers the detector directly captures the spectrum.

There are numerous interferometer designs. The basic form of the Sagnac (or common path) interferometer is illustrated in U.S. Pat. No. 4,976,542 to Smith (the "Smith patent"). Other designs include the Michelson interferometer, the Mach-Zender interferometer, the Fabry-Perot interferometer (See W. L. Wolfe, Introduction to Imaging Spectrometers, SPIE Optical Engineering Press, pp. 70-73, 1997), and a variation of the common path interferometer (Sagnac) sometimes referred to as the Barnes interferometer (see T. S. Turner Jr., et al., A Ruggedized Portable Fourier Transform Spectrometer for Hyperspectral Imaging Applications, SPIE Vol. 2585 pp 222-232.) There are also numerous dispersive spectrometers such as prism spectrometers and grating spectrometers. (See Wolfe, pp. 50-52 and 55-57).

Hyperspectral imagers have been developed for use in observing dynamic events (such as events that are changing over time or where the object is moving) with high spectral, spatial and temporal resolution over wide optical bandwidths. The "hyper" simply means that the instrument acquires a large number of spectral bands. Hyperspectral imagers also have the capability of decoupling spectral and spatial resolution. A spatially modulated Fourier transform imager can simultaneously record a complete spectrum, thus assuring spectral co-registration. Remote sensing from satellites and aircraft are among the earliest practical uses for such hyperspectral imagers.

Figure 1:
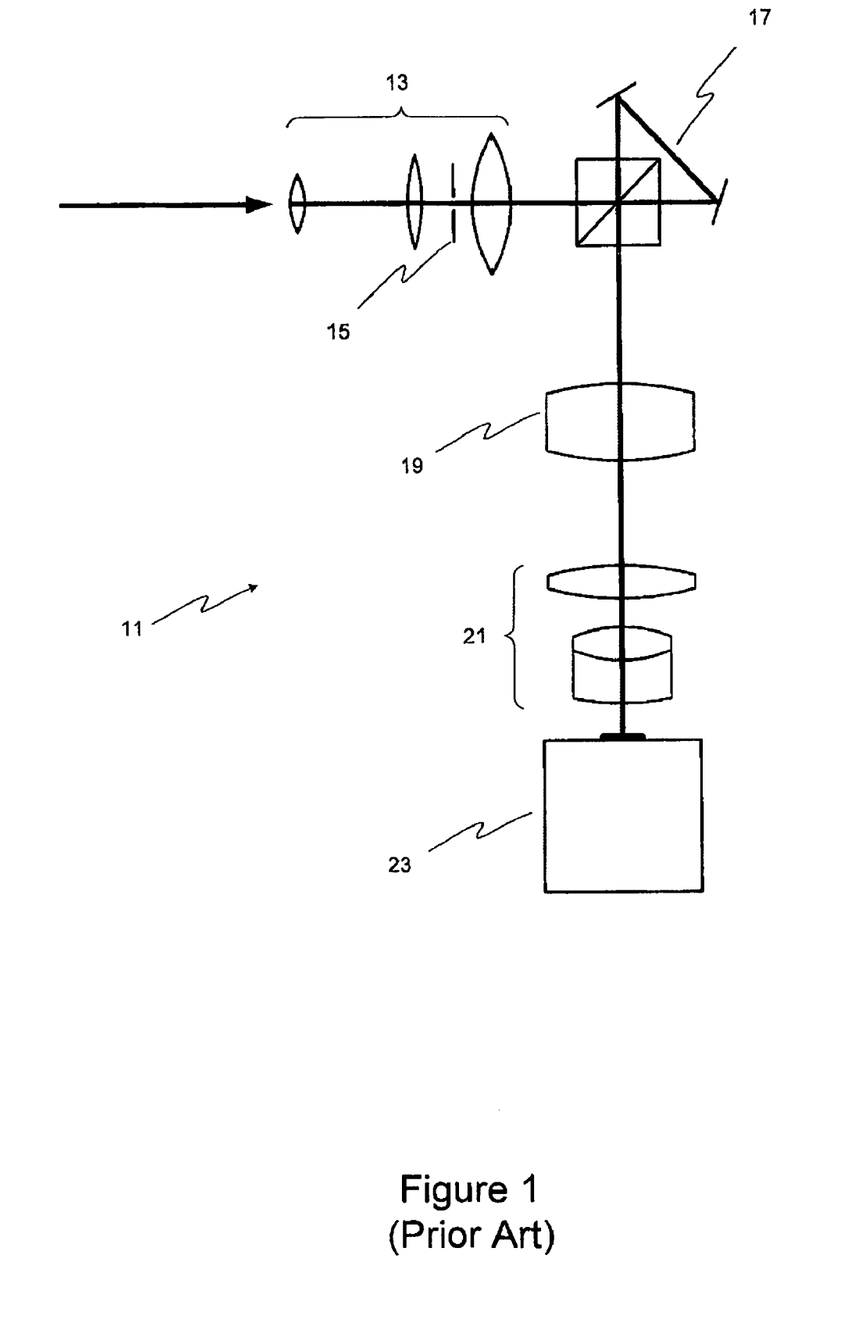
FIG. 1 is perspective schematic of a prior art hyperspectral imager.

As an illustration, in FIG. 1 a Sagnac based hyperspectral interferometric imager 11 includes fore-optics 13, a field stop 15, a common path or Sagnac interferometer 17, what is known as a Fourier lens 19, cylinder optics 21, and a detector or imager 23. (Imagers are also sometimes referred to as sensors. However, for the purpose of this application, imager will be used to refer to the detector, whether film or a semiconductor array detector (e.g., a charged coupled device or CCD).) With such a hyperspectral instrument the object is observed through fore-optics 13 that focus the image onto field stop 15, where the width of stop 15 is used only to set one dimension of the image, the spatial resolution, not to determine the spectral resolution, a unique feature of these devices. Fore-optics 13 can take the form of custom or off-the-shelf lenses, standard or custom lens systems such as used on conventional cameras, or custom or stock telescope systems for longer imaging distances. Interferometer 17 is of the type disclosed in the Smith patent. Fourier lens 19 and cylinder optics 21 are image formation lenses.

Figure 2:
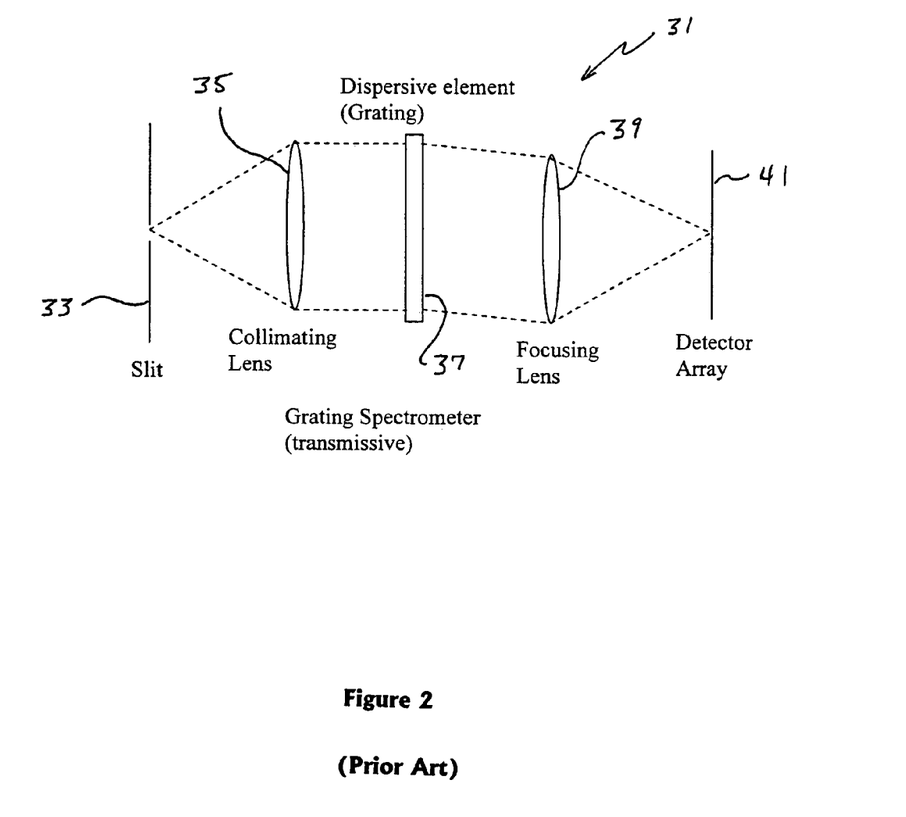
FIG. 2 is a schematic view of a prior art transmissive grating spectrometer.
Figure 3:
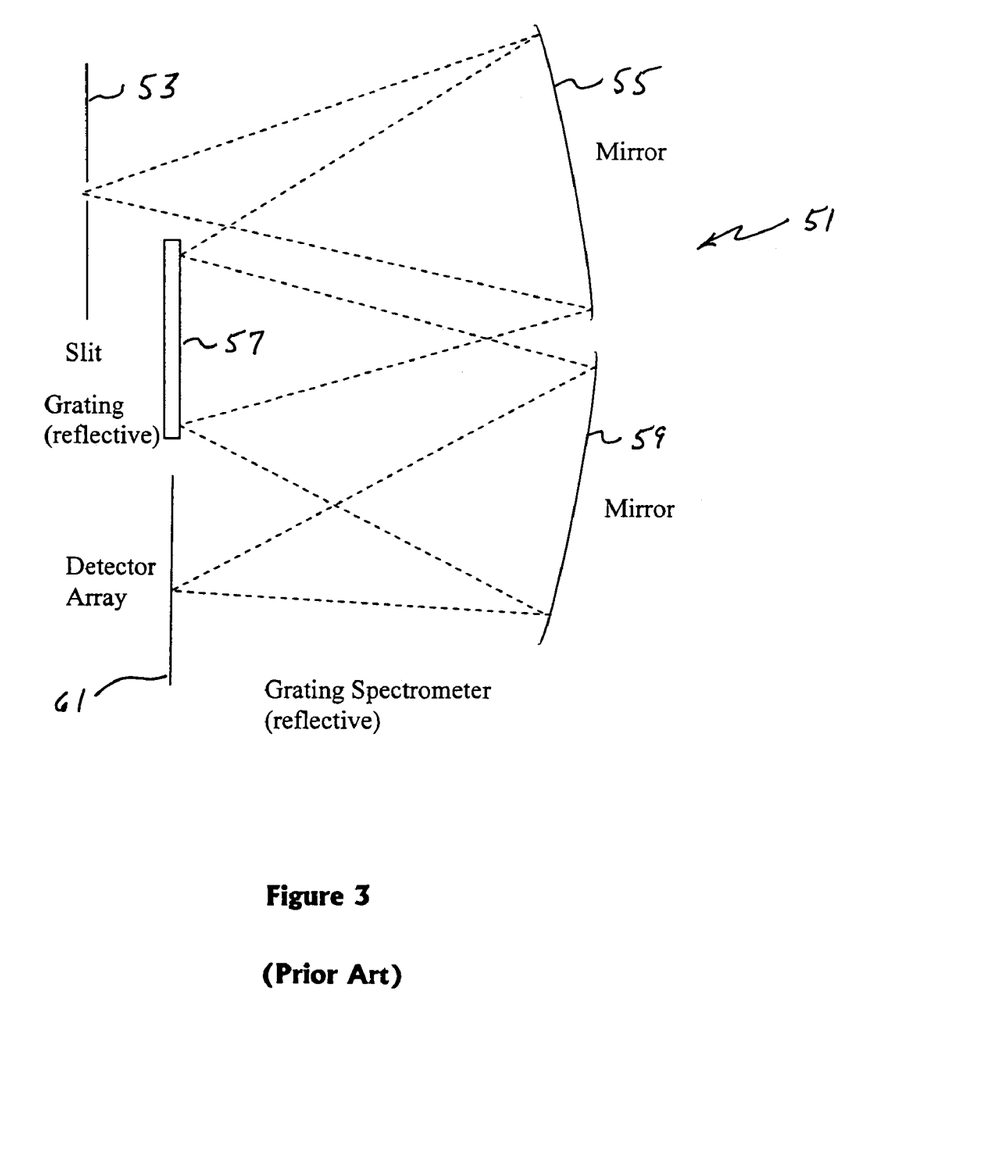
FIG. 3 is a schematic view of a prior art reflective grating spectrometer.

Typical dispersive instruments include the transmissive grating spectrometer schematically illustrated in FIG. 2 and the reflective grating spectrometer schematically illustrated in FIG. 3. Spectrometer 31 includes a slit 33, a collimating lens 35, a dispersive element 37, a focusing lens 39 and a detector array 41. As illustrated, element 37 is a transmission grating. Spectrometer 51 includes a slit 53, a first mirror 55, a reflective grating 57, a second mirror 59 and a detector array 61. Instruments with reflective gratings work over a larger range of wavelengths than those with transmissive gratings.

Up until the present invention, Applicants do not believe that imagers were used with lasers in non-laboratory settings (e.g., field measurements, manufacturing applications, etc.). Thus, the application of a spectral imager to:
  determine beam size on an object;
  determine beam location on an object;
  a determine beam parameters on an object;
  determine beam-object interaction(s);
  identify one or more specific spectral signatures based on beam-object interaction; and/or
  determine a specific event based on detecting one or more specific spectral signatures;

represents a novel and unobvious application of the technology.

OBJECTS OF THE INVENTION

It is an objective of the present invention to provide for a method of collecting radiation from at least one laser beam directed onto an object, and analyzing such radiation to determine the value of one or more parameters.

It is an additional objective of the present invention to, in response to the determined values, take one or more actions with regard to the laser beam.

To carry out the foregoing and other objectives, it is also an object of the present invention to provide an instrument with sufficiently high spectral, spatial and temporal resolution necessary to monitor reflected and emission spectra from an object across a sufficiently broad spectral band and over time to provide information sufficiently resolved to enable control of at least one laser so as to control beam location on an object, beam profile on a target, mapping of transient phenomena, and evaluation of beam-object interaction(s) (including identifying and monitoring signatures associated with specific expected beam-object interactions (e.g. object temperature, object failure, etc.)).

It is also an object to provide an instrument where the foregoing determinations are all done in parallel, to avoid temporal variations, insure spectral and spatial co-registration and allow observations of dynamic events.

It is a further object of the present invention to provide an instrument with spectral resolution sufficiently high (e.g., <40 cm−1) to permit the identification of individual chemical compounds indicative of the expected beam-object interaction(s).

SUMMARY OF THE INVENTION

The present invention relates to methods for determining one or more relationships between one or more laser beams and an object onto which such beam(s) is (are) directed. In the first instance, the method includes the steps of:
  directing a first laser beam having a first spectral signature onto the object;
  collecting at least a portion of the radiation from the first laser beam that is reflected back by the object;
  spectrally discriminating the radiation collected from the first laser beam from all other collected radiation;
  generating an image of the first collected radiation; and
  analyzing the image of the first collected radiation to determine the value of at least one parameter selected from the group including the diameter of the first beam on the object, the position of the first beam on the object, beam quality on the object.

The foregoing method may also include the step of:
  utilizing the at least one determined value to adjust one or more parameters selected from the group including beam size, beam position on the object, beam energy, and beam quality on the object.

The invention also includes:
  directing a second laser beam (having a second spectral signature typically different from the first spectral signature) onto the same object;
  collecting at least a portion of the radiation from the second laser beam that is reflected back from the object;
  spectrally discriminating the radiation collected from the second laser beam from radiation collected from the first laser beam and from all other collected radiation;
  generating an image of the second collected radiation; and
  analyzing the image of the second collected radiation to determine the value of at least one parameter selected from the group including the diameter of the second beam on the object, the position of the second beam on the object, the position of the second beam relative to the first beam, and the quality of the second beam.

The forgoing method may also include the step of:
  utilizing the determined second value to adjust one or more parameters of the second beam selected from the group including the size of the second beam on the object, the position of the second beam on the object, the position of the second beam relative to the first beam, the energy of the second beam, and the quality of the second beam on the object.

When at least one of the first and second laser beams is of sufficient power and maintained on the object for a period of time sufficient to cause an interaction with the object which results in emitted radiation, the foregoing method also includes the step of collecting at least a portion of the emitted radiation, and spectrally discriminating and imaging such emitted radiation. This image of the emitted radiation is than analyzed to determine its spectral characteristics. The determined spectral characteristics of this emitted radiation is then compared to one or more stored, predetermined spectral signatures to determine if a particular event has occurred on or in relation to the object. The determined spectral characteristics of this emitted radiation may be used to adjust more parameters of the second laser beam, such as: the position of the second beam on the object (if, for instance, the desired event has occurred); and the power of the second laser beam (including turning the energy off if the desired event has occurred).

The above described method can also be utilized with three or more lasers.

So long as the laser beams have different wavelengths, the above described method works regardless of whether the beams are separated on the object onto which they are directed, or overlap. Further, so long as the beams remain separated on the object, they can have the same wavelength.

In the preferred embodiment, one or more hyperspectral instruments is used to collect the radiation from the object (both reflected and emitted), spectrally discriminate the collected radiation, and image the collected radiation on a sensor.

DESCRIPTION OF THE PREFERRED EMBODIMENTS

Figure 4A:
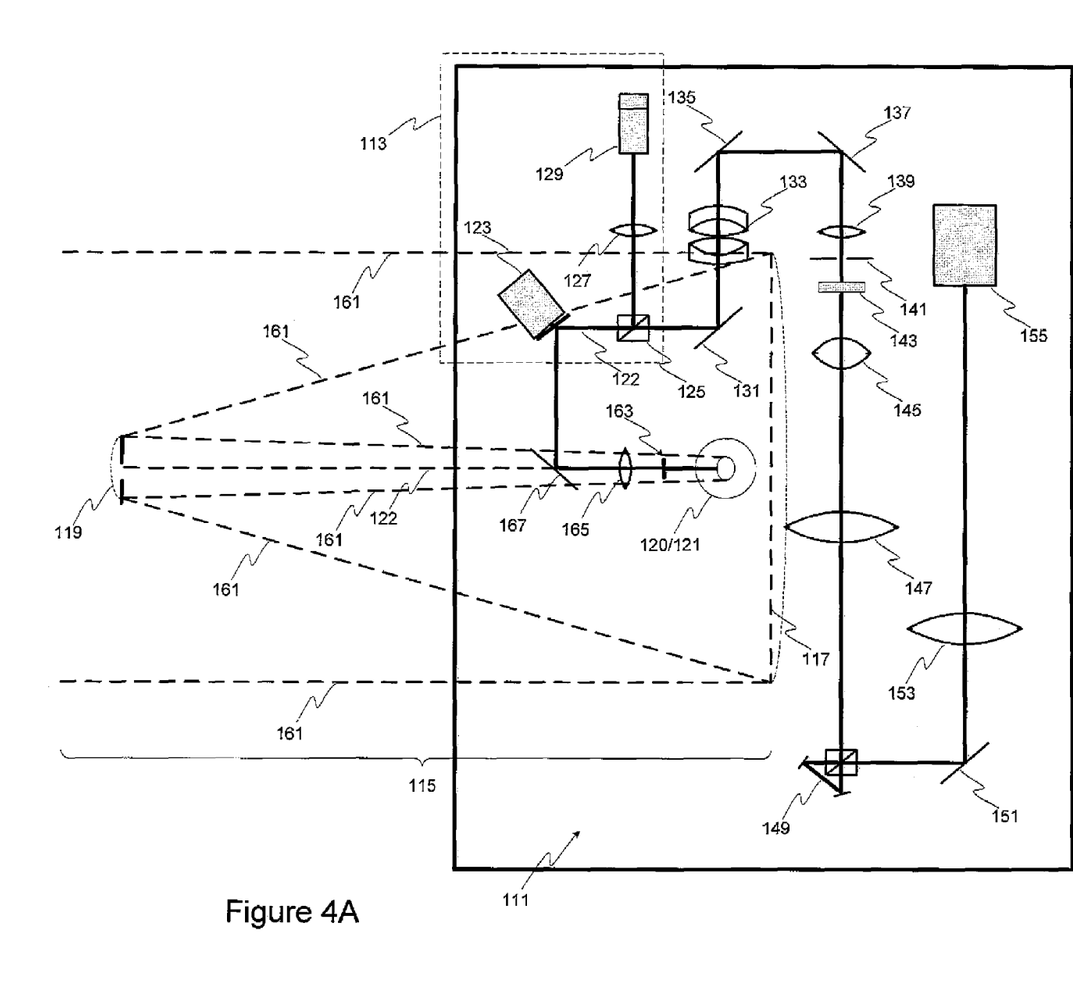
FIG. 4A is a planar optical schematic of the instrument of the present invention.
Figure 4B:
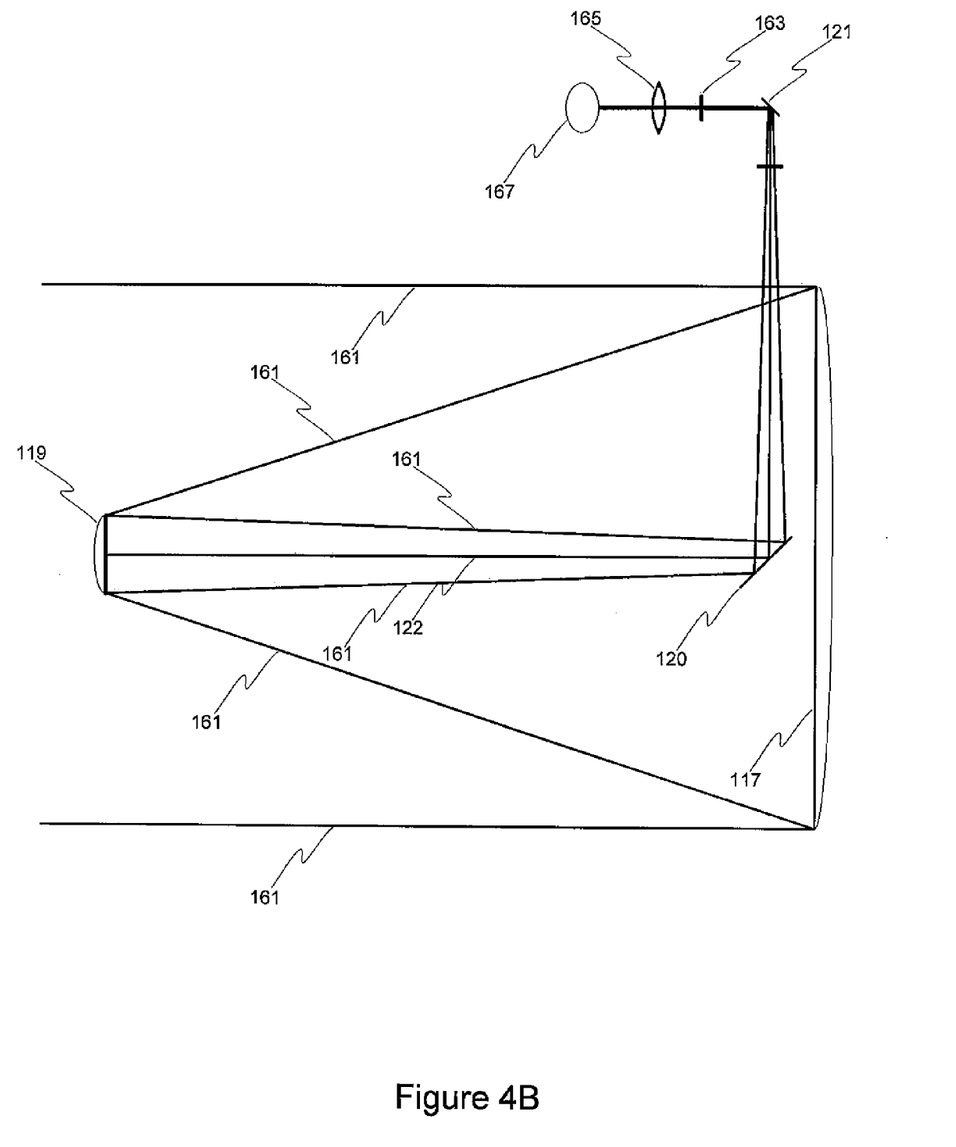
FIG. 4B is a planar optical schematic of the telescope portion of the instrument in a plane perpendicular to the plane of FIG. 4 A.

FIGS. 4A and 4B represent a schematic of the hyperspectal imager 111 of the present invention coupled, via tip/tilt control system 113, to telescope 115, for use where the object (not shown) on which the laser beam(s) (also not shown) is (are) directed is, for instance, about 15 km from the imager. Telescope 115 includes primary mirror 117, secondary mirror 119 and turning mirrors 120, 121, all positioned along optical axis 122. Tip/tilt control system 113 includes fast-steering mirror 123 and chromatic beam splitter 125 positioned along axis 122, and Dalsa camera 129. System 113 also includes a conventional frame grabber and a computer, as discussed in greater detail below. Imager 111 includes mirror 131, relay lens assembly 133, mirrors 135 and 137, a field lens 139 and a slit 141. Imager 111 also includes an optical filter 143, cylindrical lens 145, relay lens 147, Sagnac interferometer 149, mirror 151, another relay lens 153 and a detector 155. All of the foregoing are also positioned along axis 122.

The basic operation of the above-described system is as follows. Radiation, represented by beam 161 from the object (not shown) onto which the laser beam(s) (also not shown) is (are) directed, is focused by primary mirror 117, secondary mirror 119 and tertiary mirror 121 to a point 163. From focal point 163, the radiation then passes through field lens 165, reflects off mirror 167 and then onto fast-steering mirror 123. From mirror 123, the radiation enters chromatic beamsplitter 125 where it is split. Radiation with wavelengths less than 900 nm is reflected, passes through imaging lens 127 and then is measured by Dalsa camera 129. The balance of the radiation (with wavelengths greater than 900 nm) passes through beamsplitter 125 and into hyperspectral imager 111. This radiation is reflected off mirror 131, relayed by lens assembly 133, again reflected by mirrors 135 and 137 and passes through field lens 139 to form an image on slit 141. Lenses 133 and 139 constitute formatting optics. Slit 141, by blocking all but a small portion of the image, is used to pick the one-dimensional slice of the image on which the hyperspectral data from the object will be analyzed. After slit 141, the radiation is then formatted by optics 145 and 147 before entering Sagnac interferometer 149. Though not shown in FIG. 4A, there is another focal point between mirrors 203 and 205 (illustrated in FIG. 6) of interferometer 149. Finally, the output of interferometer 149 is imaged by relay lens 153 onto the plane (not shown) of detector 155, where the interference fringes are formed.

Telescope 115 is a typical Cassegrain system for forming an image of an object where the object is remotely located (e.g., 15 km). As those skilled in the art will appreciate, other optical systems will work, such as a Newtonian, or a refractive telescope. Further, as those skilled in the art will also appreciate, where the object is sufficiently close a microscope would be appropriate. In some instances even a simple lens would suffice.

Figure 5:
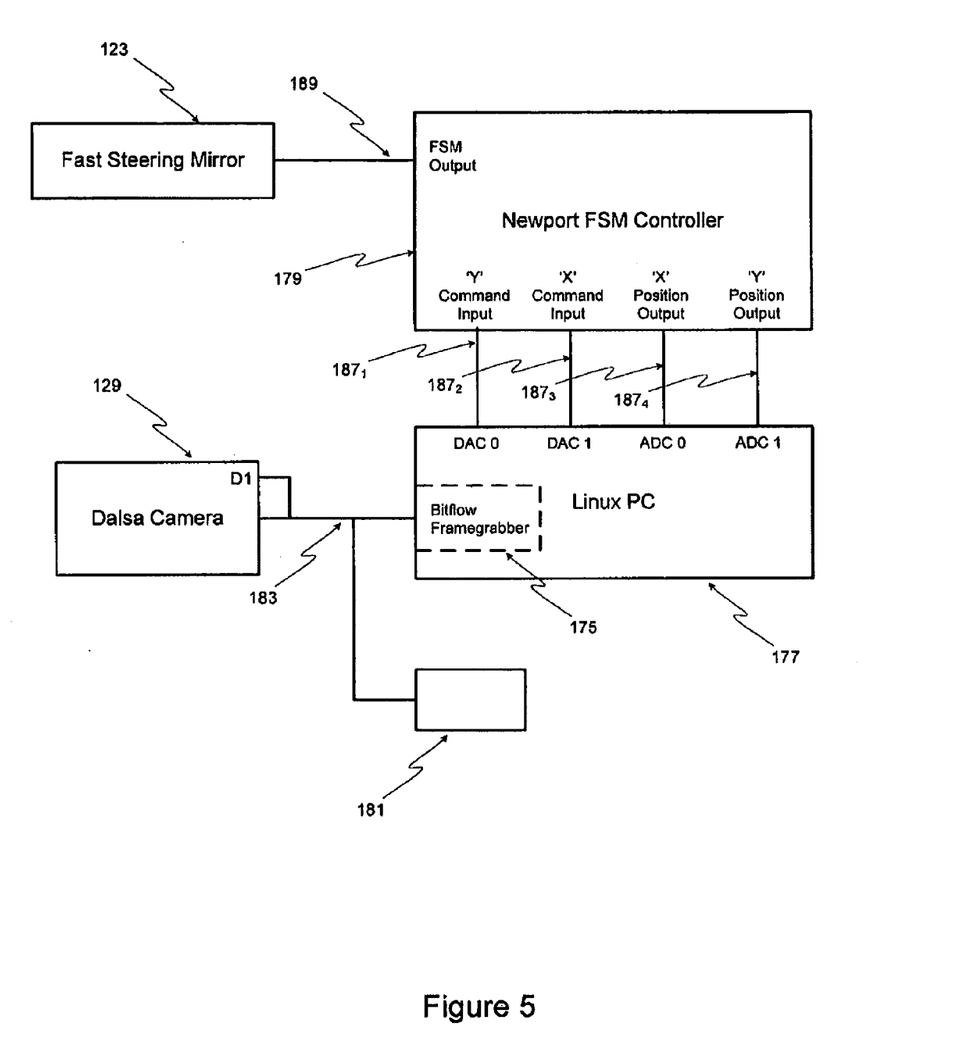
FIG. 5 is a schematic of the tip/tilt control system of the first embodiment of the present invention.

Fast-steering mirror 123 coupled to Dalsa camera 129 (type DS-12-16K5H) is used to correct the tip and tilt of beam 161 caused by refractive index changes due to atmospheric turbulence. As is evident from FIG. 5, tip/tilt control system 113 also includes a computer 177 including framegrabber 175 as well as two AMD processors (not shown), two DAC (digital to analog) cards, and two ADC (analog to digital) cards. The framegrabber 175 acquires the data from DALSA camera 129; the DAC cards ouput two voltages over coaxial cables $187_1$ and $187_2$ to fast-steering mirror 123 via controller 179; and the AMD processors permit dual processing. Feed back signals are sent via cables $187_3$ and $187_4$ to ADC cards. System 113 also includes a Dalsa power supply unit 181. The framegrabber is a Bitflow, Road Runner RUN-PCI-12; the fast-steering mirror 123, a Newport FSM 200; and controller 179 a Newport FSM 200 controller. The foregoing are connected together, as illustrated in FIG. 5, by Bitflow cable 183, cable 185, coaxial cables 1871-4 and FSM cable 189.

In contrast to prior hyperspectral imagers, where the cylindrical optics are located between the Fourier lens and the detector (see FIG. 1), in the present invention field lens 139 is placed along optical path 122 before slit 141. With this arrangement, field lens 139 compresses the image on the spatial direction of imager 111, which allows for a large field of view (FOV) while not disturbing the spectral resolution of imager 111. Such large fields of view are, for distance observations, desirable because it allows measurement of a significant slice of a distant object.

Figure 6:
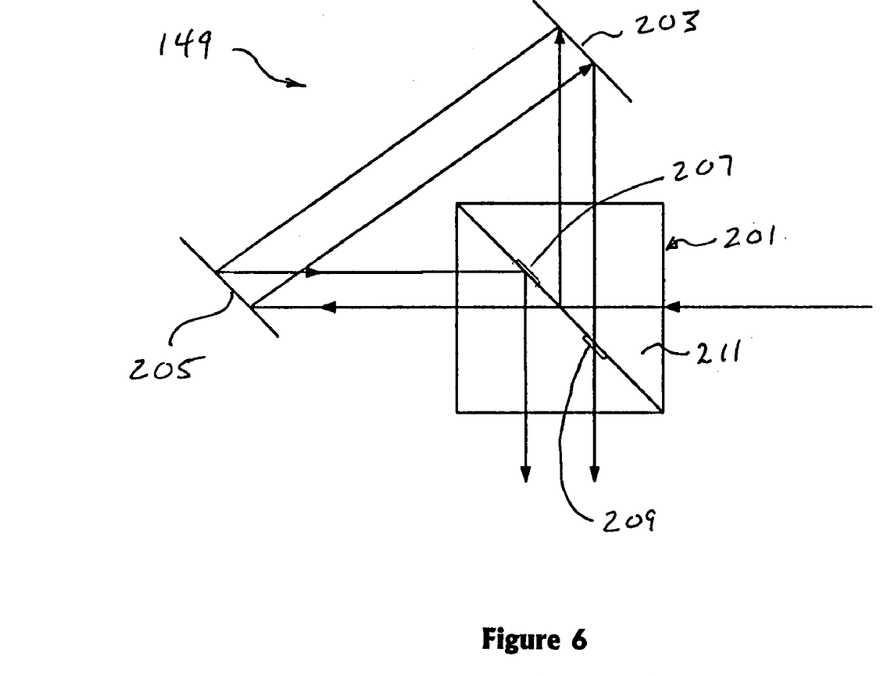
FIG. 6 is an optical schematic of the improved, compound beam splitter used in the interferometer of the present invention.
Figure 7:
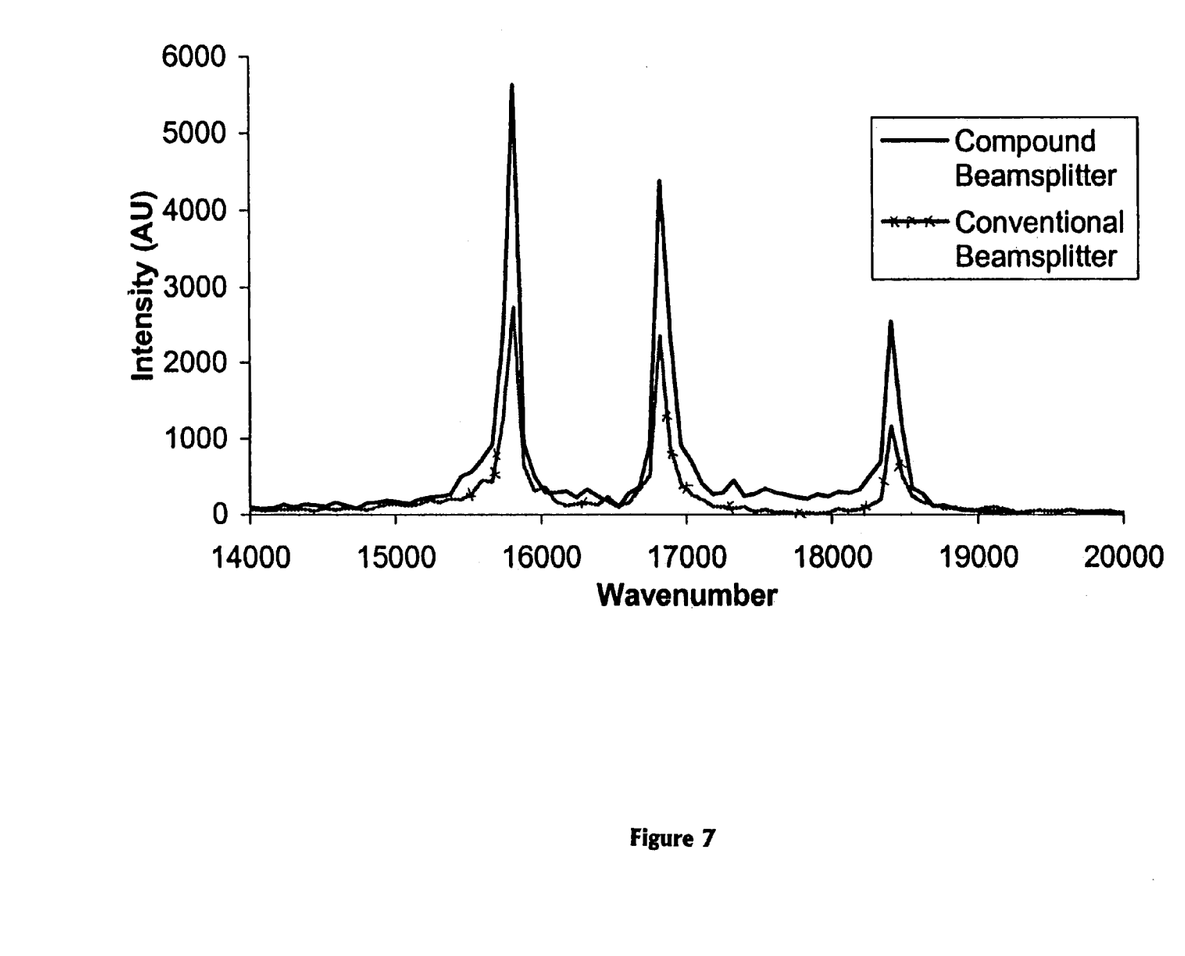
FIG. 7 is an Intensity v. Wavenumber graph, comparing the optical throughput of a conventional beam splitter with the compound beam splitter used in the present invention.

For imager 111 a new beam splitter is incorporated in Sagnac interferometer. Prior art interferometers, such as disclosed in the Smith patent, use a 50/50 beam splitter. In such an arrangement radiation from the object of interest is split into two by the beamsplitter, which then circulates either clockwise or counter-clockwise around the interferometer. The radiation then outputs with a shear between the two beams, which when combined at the detector plane forms the interference pattern. In this type of design however, half of the input radiation exits back through the input and is lost in the fore-optics of the instrument. Such a loss of radiation has always been a characteristic with interferometers, and can limit their use in low signal-to-noise conditions. For the present invention a high efficiency beam splitter, as schematically illustrated in FIG. 6, is utilized. With this arrangement radiation from the input is again split 50/50 by the central region of beamsplitter 201. This radiation will again circulate either clockwise or counter-clockwise, and then will either be reflected or pass through the beamsplitter. Providing coatings on beamsplitter 201 in the regions marked 207 and 209 to be, respectively, 100% reflective and 100% transmissive ensures that no radiation is sent back along the input path. The first generation of this beamsplitter is disclosed and claimed in application Ser. No. 10/723,901, filed Nov. 25, 2003, the disclosure of which is incorporated by reference. This application and application Ser. No. 10/723,901 are commonly assigned. This beamsplitter has been tested to determine its efficiency. An example of the improvement over the beamsplitter of the Smith patent can be seen in FIG. 7, which shows the difference between a standard beam splitter and the improved beam splitter of the 10/723,901 application for three laser wavelengths, 543.5 nm (18416 cm−1), 594 (16385 cm−1), and 632.8 nm (15802 cm−1). The spectral resolution is 72 cm−1 or 2.8 nm at 632.8 nm. Using this new beamsplitter enables lower signals to be recovered, which in the case of the diagnostic measurements makes this design very attractive.

The invention of the Ser. No. 10/723,901 application has been further improved by embedding the splitting surfaces within block of glass 211, instead of on the surface. With this arrangement any aberrations in the incoming beam arc effectively cancelled in the interference pattern. Previously, any aberrations in the fore optics of the interferometer would cause the interference fringes formed on the detector not to be straight; this causes problems when trying to accurately reconstruct the spatial component of the data. Balancing out the interferometer beamsplitter by placing the active surfaces in the middle of glass block 211 effectively cause the optical path difference for the two legs of the interferometer to be equal. Although the aberrations are still present in the two beams, the optical path difference is now identical, so when the interference fringes are formed, the fringes are straight. Such a property is beneficial for imaging through the atmosphere as the aberrations are time varying If this correction was not implemented, the fringes would move as the atmosphere changes and make processing of the resultant data very difficult.

Detector 155 is a Sensors Unlimited SM640UT, coupled to a National Instruments framegrabber (not shown), using a conventional PC computer standard (also not shown) running Windows XP, professional edition, as a host. As those skilled in the art will appreciate the performance specifications for detector 155 will vary depending upon the design and application of the system (e.g., fore-optics, hyperspectral imager, etc.). For the system described above, a detector with 1024 by 1024 pixels is preferred. A detector with fewer pixels (e.g., 640 by 480) will limit both the spectral and spatial resolution of the system. Furthermore, the sensitivity of the detector will vary depending upon the application. Again, for the above described system a bandwidth of 1 µm to 2.2 µm is preferred. The method used to collect the data from detector 155 is discussed below.

The design specification of the above described system is set forth in Table 1, below.

TABLE 1

| Spectral Bandpass | 900 nm to 1700 nm |
|---|---|
| Spectral Resolution | 40 cm$^{-1}$ |
| IFOV | 0.0025 mrad |
| Spatial Resolution | 6 cm |
| Field of View | 1.6 mrad |
| Field of Regard | fixed |
| LOS Stability | 1 µrad |
| LOS Bandwidth | 1 to 60 Hz |
| Temporal Resolution | 33 msec |

As those skilled in the art are aware, there are various methods of processing of interferometric data. See, for instance, Brault, J. W., *New Approach to High-precision Fourier Transform Spectrometer Design*. Applied Optics, 1996. 35(16): p. 2891-2896; Courtial, J., et al., *Design of a Static Fourier-transform Spectrometer With Increased Field of View*. Applied Optics, 1996 35(34): P. 6698-6702; Otten, L. J., III. *Fourier Transform Hyperspectral Imager Payload on MightySat II.* in *Small Satellite Conference, International Space Congress*. 1995. Brenam, Germany; Otten, L. J., III, J. B. Rafert, and R. G. Sellar. *Design of an Airbourne Fourier Transform Visible Hyperspectral Imaging System for Light Aircraft Environmental Remote Sensing*. in *SPIE Aerospace/Defense Sensing and Dual-Use Photonics*. 1995. Orlando, Fla.; Otten, L. J., III, R. G. Sellar, and J. B. Rafert. *MightySatII*. 1 *Fourier transform hyperspectral imager payload performance*. in *European Symposium on Satellite Remote Sensing II*. 1995. Paris, France; Otten, L. J., III and A. D. Meigs. *Calibration and Performance of the Airborne Fourier Transform Visible Hyperspectral Imager (FTVHSI)*. in *Second International Airborne Remote Sensing Conference and Exhibit*. 1996. San Francisco, Calif.; and Rafert, J. B., R. G. Sellar, and J. H. Blatt, *Monolithic Fourier-transform imaging spectrometer*. Applied Optics, 1995. 34(31): p. 7228-7230.

As those skilled in the art will also appreciate, the choice of processing scheme will depend upon the application of the system and the information that is to be extracted from the raw data. A basic processing scheme for the above described system includes the following steps:

Bad pixel correction and background removal;
Correction for the reduced signal due to the central obscuation of telescope 115;
Applying a Hanning filter to remove any ringing due to discontinuity at the edges of the data;
Zero padding the data to allow use of a Fast Fourier transform; and
Using Fast Fourier transform in order to produce the spectra from the interoferogram.

The above described system can be used to resolve both spectral and spatial information from a distant object, at least partially illuminated with a first laser beam, to determine the value of at least one parameter or feature of radiation reflected or emitted from such object. For the above described system, the methodology includes the steps of:

collecting radiation from the object over the bandwidth of detector 155;
spacially conditioning such collected radiation;
spectrally discriminating the collected radiation;
generating a sequence of images over time of the conditioned and discriminated radiation; and
analyzing the collected images to determine the value of one or more parameters selected from the group including beam size on the object, beam position on the object, beam energy and, where the spot can be resolved, beam quality.

The collected radiation can be: radiation from a first laser beam reflected from the object; radiation from one or more subsequent laser beams (e.g., second and third beams) reflected from the object; and radiation originating from the object itself, such as originating from the object as a result of a laser beam-object material interaction. The spatial conditioning is achieved by the fore optics, as discussed above. The spectral discrimination is achieved by the interferometer, as also discussed above.

Figure 8:
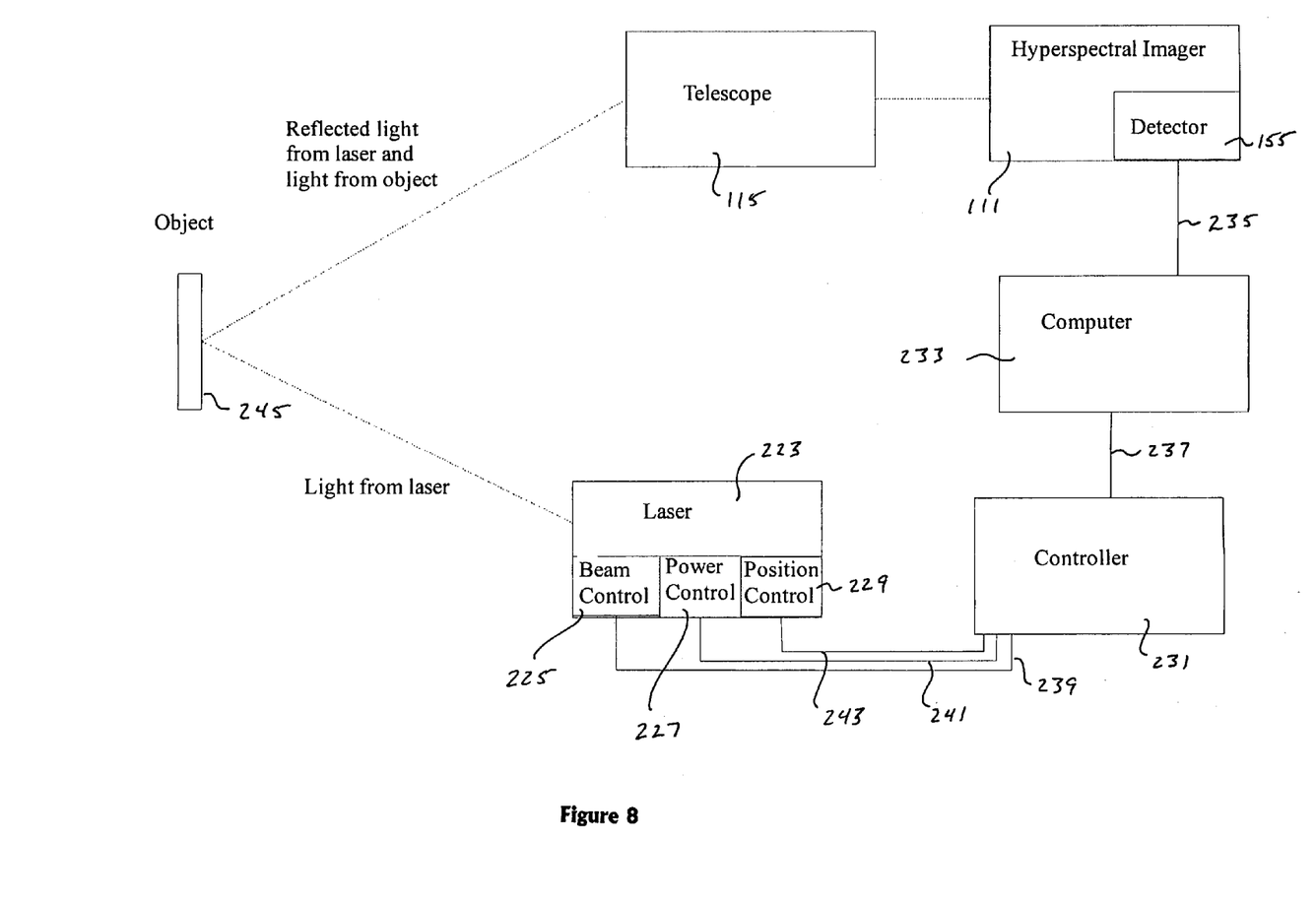
FIG. 8 is a schematic of the closed loop system of the presentation.

The above-described system can be integrated with one or more laser beams to provide a closed loop system. Such an integrated system 221, as schematically illustrated in FIG. 8, includes laser 223 (including beam control 225 which controls the shape of the spot where it leaves laser 223, power control 227 and position control 229), controller 231, computer 233, imager 111, detector 155 and telescope 115. Laser 223, controller 231, computer 233 and detector 155 are suitably connected via cables 235, 237, 239, 241 and 243. Detector 155 and telescope 115 are connected as set forth in FIGS. 4 A and B.

With such a system, the methodology also includes the step of directing at least a first laser (223) onto object 245 and selecting information obtained from the above described analysis to adjust one or more parameters of the laser, selected from the group including beam size, beam position on the object, length of time on the object, and beam energy.

Generally speaking, with the above described closed loop system, the following information can be obtained:

The size of a first beam directed on the object;
The position of the first beam on the object;
The quality of the first beam;
The energy of the first beam on the object;
The size of a second beam directed on to the object;
The position of the second beam on the object;
The position of the second beam relative to the first beam;
The quality of the second beam; and
The energy of the second beam on the object.

In addition to the foregoing, any or all of the parameters described above can be controlled for a third or subsequent laser beam directed onto the object. Further, for each subsequent beam, the temperature of/energy deposition on the object can be controlled.

Where there is an interaction between any one of the beams and the object, which interaction results in radiation being emitted from the object (as opposed to beam radiation reflected back by the object), such radiation can also be collected, conditioned, discriminated, imaged, analyzed and used to control or manage the effect (e.g., turn one or more lasers off, or redirect one or more of the lasers). A series of predetermined spectral signatures (representative of known and/or anticipated interactions) can be stored in computer 233 and utilized in the analysis. As those skilled in the art will appreciate, the analysis and control is tailored to achieve the specific parameters and/or features that are of interest in a particular application or applications.

Whereas the drawings and accompanying description have shown and described the preferred embodiment of the present invention, it should be apparent to those skilled in the art that various changes may be made in the form of the invention without affecting the scope thereof.

We claim:

1. A method for determining one or more relationships between one or more laser beams and an object onto which such beam(s) is (are) directed, the method including the steps of:
    (a) directing a first laser beam having a first spectral signature onto the object;
    (b) collecting at least a portion of the radiation from the first laser beam that is reflected back by the object;
    (c) spectrally discriminating the radiation collected from the first laser beam from other collected radiation;
    (d) generating a spectral image of the discriminated radiation collected from the first laser beam; and
    (e) analyzing the spectral image of the radiation collected from the first laser beam to determine the value of at least one parameter selected from the group including the diameter of the first laser beam on the object, the position of the first laser beam on the object, and beam quality on the object.

2. The method of claim 1, further including the step of utilizing the at least one determined value to adjust one or more parameters of the first laser beam selected from the group including beam size, beam position on the object, beam energy, and beam quality on the object.

3. The method of claim 1, further including the steps of:
    (a) directing a second laser beam having a second spectral signature onto the object;
    (b) collecting at least a portion of the radiation from the second laser beam that is reflected back from the object;
    (c) processing the radiation collected from the second laser beam, the processing selected from the group including, (i) spectrally discriminating the radiation collected from the second laser beam from the radiation collected from the first laser beam, (ii) spacially discriminating the radiation collected from the second laser beam from radiation collected from the first laser beam, and (iii) both spectrally and spacially discriminating the radiation collected from the second laser beam from the radiation collected from the first laser beam;
    (d) generating a spectral image of the discriminated radiation collected from the second laser beam; and
    (e) analyzing the spectral image of the radiation collected from the second laser beam to determine the value of at least one parameter selected from the group including the diameter of the second laser beam on the object, the position of the second laser beam on the object, the position of the second laser beam relative to the first laser beam, and the quality of the second laser beam on the object.

4. The method of claim 3, wherein the processing of the collected radiation is limited to spectrally discriminating when the first and second spectral signatures are different and the first and second laser beams totally overlap on the object.

5. The method of claim 3, wherein the processing of the collected radiation is limited to spacially discriminating when the first and second spectral signatures are the same and the first and second laser beams are at least partially separated on the object.

6. The method of claim 3, wherein the processing of the collected radiation is both spectrally and spacially discriminating when the first and second spectral signatures are different and the first and second laser beams are at least partially separated on the object.

7. The method of claim 3, further including the step of utilizing the determined second value to adjust one or more parameters of the second laser beam selected from the group including the size of the second laser beam on the object, the position of the second laser beam on the object, the position of the second laser beam relative to the first laser beam, the energy of the second laser beam, and the quality of the second laser beam on the object.

8. The method of claim 3, wherein the power of the second laser beam is set at a level whereby the second laser beam can interact with the object.

9. The method of claim 8, further including the step of maintaining the second laser beam on the object for a period of time sufficient to cause an interaction with the object which interaction emits radiation from the object.

10. The method of claim 9, further including the steps of:
    (a) collecting a portion of the emitted radiation;
    (b) discriminating the collected emitted radiation from:
        (i) the radiation collected from the first laser beam,
        (ii) the radiation collected from the second laser beam, and
        (iii) all other collected radiation;
    (c) generating a spectral image of the discriminated collected emitted radiation; and
    (d) analyzing the image of the collected emitted radiation to determine at least some of its spectral characteristics.

11. The method as set forth in claim 10, further including the step of comparing the spectral characteristics of the collected emitted radiation to one or more stored, predetermined spectral signatures to determine if a particular event has occurred on or in relation to the object.

12. The method of claim 11, further including the step of adjusting one or more parameters of the second laser beam selected from the group including the size of the second laser beam on the object, the position of the second laser beam on the object, the position of the second laser beam relative to the first laser beam, the energy of the second laser beam, and the quality of the second laser beam on the object.

13. The method of claim 1, wherein the object emits radiation and further including the steps of:
    (a) collecting a portion of the emitted radiation;
    (b) discriminating the collected emitted radiation from:
        (i) the radiation collected from the first laser beam; and
        ii) all other collected radiation;
    (c) generating a spectral image of the discriminated collected emitted radiation; and
    (d) analyzing the image of the collected emitted radiation to determine at least some of its spectral characteristics.

* * * * *